Patented Sept. 7, 1943

2,328,710

UNITED STATES PATENT OFFICE 2,328,710

METHOD FOR STABILIZING ORGANIC THIONITRITES

George S. Crandall, Woodbury, N. J., Richard S. George, State College, Pa., and Edwin M. Nygaard, Woodbury, N. J., assignors to Socony-Vacuum Oil Company, Incorporated, New York, N. Y., a corporation of New York No Drawing. Original application June 27, 1940, Serial No. 342,692. Divided and this application December 27, 1941, Serial No. 424,598

6 Claims. (Cl. 44—57)

This application, which is a division of our copending application Serial No. 342,692, filed June 27, 1940, relates to the stabilization of organic thionitrites and is more particularly concerned with the stabilization of an organic thionitrite in solution in a suitable solvent.

The method of the present invention had its origin in the observation that organic thionitrites were effective to improve the ignition quality of hydrocarbon fuels for compression ignition engines, which was attended by the further observation that the instability of organic thionitrites made their practical value in this regard questionable.

In preparing a fuel blend for compression ignition of Diesel engines with an organic thionitrite, the thionitrite may be added to the fuel in the pure state, it may be added to the fuel in solution in a suitable solvent, or it may be formed in situ in the fuel or in another suitable solvent, which in turn can be blended with the fuel. It is important, therefore, that the organic thionitrite be substantially stable against decomposition both prior to and after its addition to the fuel, and the present invention is broadly directed to a method for effecting such stabilization irrespective of the solvent in which it is dissolved. Typical solvents for the organic thionitrites are ether, carbon disulfide, carbon tetrachloride, and liquid hydrocarbons such as benzene, hexane, and petroleum fractions such as gasoline, kerosene, fuel oils and heavier fractions such as lubricating oils.

The organic thionitrites are compounds having the general formula RSNO. They may be synthesized in various ways as by the reaction of a mercaptan with nitrosyl chloride, or preferably by the interreaction of a mercaptan with an alkali nitrite and a mineral acid in a non-homogeneous liquid system as described in our copending application Serial No. 338,736, filed June 4, 1940.

Although, as aforesaid, this invention is broadly directed to the stabilization of organic thionitrites in solution irrespective of the solvent, the principal object of the present invention is to provide a method for stabilizing organic thionitrites in Diesel fuel oil blends containing same. The instability of organic thionitrites in Diesel fuel oil solutions manifests itself by the loss of the typical thionitrite color, development of sludge or sludgy materials and loss of the enhanced ignition quality.

Our invention is predicated upon the discovery that a Diesel fuel oil-organic thionitrite blend can be stabilized by admixing therewith a minor proportion of a compound which will prevent the accumulation of the higher oxides of nitrogen in the blend. This may be explained on the theory that the higher oxides of nitrogen apparently accelerate, by catalytic action and by direct reaction, the decomposition of the thionitrite and are instrumental in the formation of sludge and sludgy materials from constituents naturally occurring in the fuel oil.

In further explanation of the foregoing, it has been shown (Ber. 59, 1314 (1926)) that organic thionitrites are subject to two types of decomposition: namely, "Thermal decomposition," which takes place slowly at room temperature and in which the thionitrite decomposes irreversibly to the disulfide and nitric oxide according to the following equation:

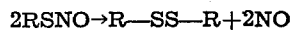

$$2RSNO \rightarrow R-SS-R + 2NO$$

and "Auto oxidation," wherein the thionitrite is rapidly decomposed in the presence of oxygen into the disulfide and nitrogen tetroxide according to the following equation:

$$2RSNO + O_2 \rightarrow R-SS-R + N_2O_4$$

The nitric oxide formed in the former decomposition is oxidized to the higher oxides which, as stated above, apparently act catalytically to accelerate the decomposition of the thionitrite and react with naturally occurring constituents in the oil, such as unsaturated hydrocarbons, etc., to form sludgy materials. The higher oxides of nitrogen ($N_2O_3$ and $N_2O_4$) also react with many of the thionitrites to set up chain reactions which ultimately lead to sulfonic acids, sulfones, etc., and oxides of nitrogen.

We have found that tertiary butyl catechol may be effectively used to prevent the accumulation of oxides of nitrogen in an organic thionitrite solution such as the aforesaid Diesel fuel-thionitrite blend and thereby retard deterioration of the thionitrite and stabilize the solution or fuel blend.

To demonstrate the efficacy of tertiary butyl catechol as a stabilizer for Diesel fuel oil-thionitrite blends, we prepared a Diesel fuel oil blend containing 1% of amyl thionitrite and tertiary butyl catechol was added to samples of the blend, which were then stored in two sets under different conditions. One set was stored dry in glass bottles; the other was stored in glass bottles containing water and an iron nail. The effectiveness of the stabilizer was determined primarily by the length of time during which the red color of the thionitrite persisted and the length of time before there was an appearance of sludge in the oil. Table I below gives the results obtained with the samples stored "dry" and Table II sets forth the results obtained with the samples stored over 5% by volume of water with an iron nail in each sample. Both sets of samples were stored at prevailing room temperature.

TABLE I

*Samples stored "dry" in glass*

| Stabilizer | Per cent added by weight | Days elapsed before appreciable color loss | Days elapsed before appearance of sludge |
|---|---|---|---|
| None | | 5 | 3 |
| Do | | 5 | 5 |
| Tertiary butyl catechol | 0.5 | 56+ | 19 |

TABLE II

*Samples stored over water in presence of iron*

| None | | <1 | <1 |
|---|---|---|---|
| Tertirary butyl catechol | .5 | 24 | 8 |

It will be seen from the foregoing results that an organic thionitrite solution such as a Diesel fuel oil blend containing an organic thionitrite may be stabilized against deterioration by the additon thereto of tertiary butyl catechol which will prevent the accumulation of oxides of nitrogen in the blend. The tertiary butyl catechol may be added in varying proportions, depending upon the character and amount of thionitrite in the blend, etc., and in general it produces the desired stabilizing effect in amounts ranging from about 0.01 to about 5 times the quantity of thionitrite present in the solution.

We claim:

1. The method of stabilizing an organic thionitrite solution against deterioration which comprises admixing with said solution a minor proportion of tertiary butyl catechol.

2. The method of stabilizing a blend of Diesel fuel and an organic thionitrite against deterioration which comprises admixing with said blend a minor proportion of tertiary butyl catechol.

3. A Diesel fuel oil blend having in admixture therewith a minor proportion of an organic thionitrite and a minor proportion of tertiary butyl catechol.

4. A Diesel fuel oil blend having in admixture therewith amyl thionitrite and tertiary butyl catechol in minor proportions.

5. The method of stabilizing an organic thionitrite solution against deterioration which comprises admixing with said solution a minor proportion of an alkyl substituted catechol.

6. A Diesel fuel oil blend having in admixture therewith a minor proportion of an organic thionitrite and a minor proportion of an alkyl substituted catechol.

GEORGE S. CRANDALL.
RICHARD S. GEORGE.
EDWIN M. NYGAARD.